United States Patent [19]

Boehme et al.

[11] 4,076,681

[45] Feb. 28, 1978

[54] PROCESS FOR DISSOLVING HIGH MOLECULAR WEIGHT OLEFIN POLYMERS IN LIQUID HYDROCARBONS

[75] Inventors: Robert Emerson Boehme; Clarence Rhodes Murphy, both of Houston, Tex.

[73] Assignee: Gulf Oil Corporation, Pittsburgh, Pa.

[21] Appl. No.: 715,803

[22] Filed: Aug. 19, 1976

[51] Int. Cl.² ............................................. C08K 5/01
[52] U.S. Cl. ............................ 260/33.6 PQ; 209/316; 210/70; 210/71; 210/DIG. 15; 366/76; 260/34.2
[58] Field of Search ..................... 260/33.6 PQ; 259/7, 259/8, 108; 210/70, 71, DIG. 15; 209/315, 316

[56] References Cited

U.S. PATENT DOCUMENTS

| | | | |
|---|---|---|---|
| 2,894,824 | 7/1959 | Lanning | 210/DIG. 15 |
| 2,930,787 | 3/1960 | Stalder | 210/DIG. 15 |

FOREIGN PATENT DOCUMENTS 1,372,116  10/1974  United Kingdom.

OTHER PUBLICATIONS

Watt et al. - Chemistry, (Norton), (N.Y.) (1964), p. 236.

*Primary Examiner*—Donald E. Czaja
*Assistant Examiner*—H. H. Fletcher
*Attorney, Agent, or Firm*—Richard L. Kelly

[57] ABSTRACT

The invention is directed to a process of dissolving a high molecular weight olefin polymer having an inherent viscosity of at least 3.5 in a hot hydrocarbon solvent to form solutions which are totally free of undissolved polymer particles. Apparatus for carrying out the process also is described.

The process includes stirring a slurry of fine particles of the polymer and the solvent in a chamber whose inlet and outlet are covered with screens. The outlet screen has a smaller mesh than the inlet screen. The solution is filtered through the outlet screen into a second chamber which is similar to the first one except that the second outlet screen is finer than the first outlet screen. The stirring and filtering through successively finer outlet screens is repeated in a series of chambers until a solution which is free of undissolved polymer particles is obtained. The solution is kept at least 190° C throughout the process.

5 Claims, 2 Drawing Figures

1

PROCESS FOR DISSOLVING HIGH MOLECULAR WEIGHT OLEFIN POLYMERS IN LIQUID HYDROCARBONS

BACKGROUND OF THE INVENTION

British patent Spec. No. 1,372,116 describes the preparation of fibril-like materials suitable for the manufacture of waterlaid sheets. Such products are prepared from ultra high molecular weight olefin polymers and are referred to as fibrils. Such fibrils are prepared by feeding a hydrocarbon solution of the olefin polymer to a special type of apparatus in which the hot polymer solution is subjected to high shear forces, and subsequently cooled to precipitate highly-oriented fibrils of the olefin polymer from the hydrocarbon.

The preparation of the hot hydrocarbon solutions of such olefin polymers for use in the process of British patent Spec. No. 1,372,116 presents difficult technical problems. By reason of the ultra high molecular weight of the olefin polymers employed in the process, such polymer solutions have very high viscosities at low concentrations of the olefin polymer. The high viscosities of such polymer solutions makes it difficult to provide adequate stirring to assist in dissolving all of the olefin polymer. It is essential to dissolve all of the olefin polymer in the hydrocarbon solution, as it has been observed that the presence of even minute quantities of undissolved olefin polymer in the polymer solution has an adverse effect upon the quality of the ultimate fibrils prepared therefrom.

To facilitate the preparation of hydrocarbon solutions of such olefin polymers, it has been proposed to ameliorate the problem of dissolving the polymer by comminuting the olefin polymer to very small particles to accelerate its rate of dissolution in the liquid hydrocarbon. Notwithstanding this technique, difficulties in dissolving all of the polymer particles are still presented. It is believed that the difficulty results from the fact that the fine polymer particles imbibe hydrocarbon at their surface and swell to a volume substantially larger than the original size of the polymer particles. The surfaces of such swollen polymer particles tends to be quite tacky and, when such swollen polymer particles contact each other, they tend to fuse together and form agglomerates of the swollen polymer particles. Apparently the rate of diffusion of the liquid hydrocarbon into such agglomerates is slow.

SUMMARY OF THE INVENTION

The applicants have provided, by means of the present invention, apparatus which not only dissolves ultra high molecular weight olefin polymer in liquid hydrocarbon at relatively high rates, but also completely dissolves all of the olefin polymer so that the solution obtained therefrom is totally free of undissolved polymer particles.

DETAILED DESCRIPTION OF THE INVENTION

Figure 1:
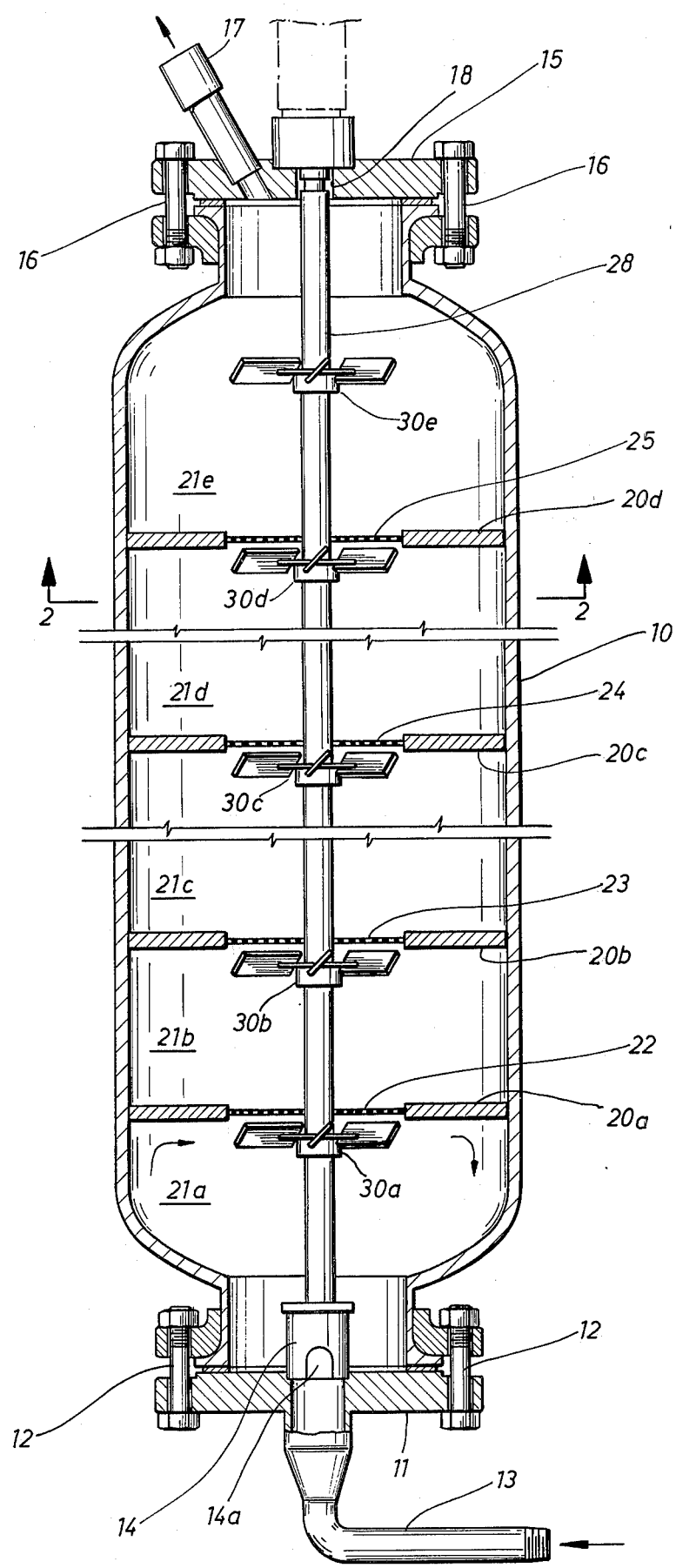
FIG. 1 is a side view partially in section of one embodiment of the polymer dissolving apparatus of the invention.
Figure 2:
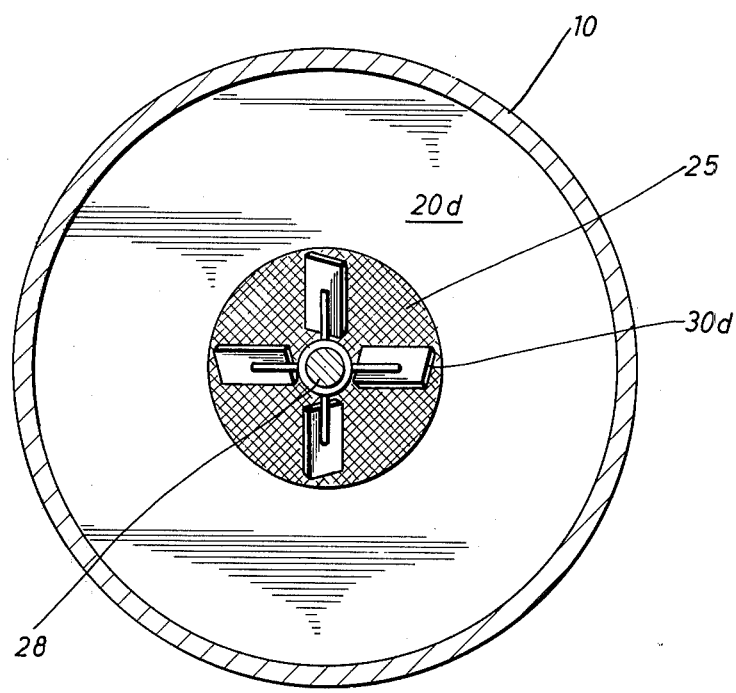
FIG. 2 is a sectional view of the apparatus of FIG. 1 taken through 2 — 2.

Referring to the drawings, the polymer dissolving apparatus has a vertically-aligned cylindrical tube 10 febricated of metal and designed to withstand internal operating pressures of the order of at least about 100 psig. Tube 10 has an L/D ratio of 4.1. A fitting 11 is attached to the bottom inlet of 10 with bolts 12. Fitting 11 includes a liquid entry line 13 and a shaft guide 14. A series of liquid entry ports 14a are included in guide 14. A fitting 15 is attached to the top outlet of 10 with bolts 16. Fitting 15 includes an outlet pipe 17 and a centered opening 18, the funtion of which will be described subsequently.

A series of baffle plates, 20a, 20b, 20c, and 20d, are provided and divided tube 10 into a series of interconnected fluid chambers 21a, 21b, 20c, 21d, and 21e. Each of the baffle plates has a circular opening in its center. These circular openings are of identical size and can be visualized as defining a column running vertically through tube 10. Wire screen covers 22 (4 mesh), 23 (8 mesh), 24 (12 mesh) and 25 (16 mesh) are fitted into and held in the openings of baffle plates 20a, 20b, 20c, and 20d by suitable fasteners not shown. A stirrer shaft 28 runs throughout tube 10 with its end riding in journalled shaft guide 14. The shaft is journalled in opening 18 of fitting 15 and is driven by drive means not shown. Shaft 28 carries a series of identical sets of turbine stirring blades 30a, 30b, 30c, 30d, and 30e. The turbine blades are positioned close to the screens 22, 23, 24, and 25 so as to provide a clearance of ¼ inch or less.

In operation, a slurry of fine particles of an ethylene polymer in a liquid hydrocarbon that has been heated to about 190° C is delivered to line 13 of the polymer dissolving apparatus. Typically, this slurry will contain 4 parts by weight of ethylene polymer and 96 parts by weight of a liquid hydrocarbon such as kerosene. The ethylene polymer will be of very high molecular weight and will have an inherent viscosity of at least 3.5. The slurry will contain some dissolved ethylene polymer and a large number of polymer particles that have become highly swollen by imbibing the hydrocarbon solvent. The slurry also will contain a significant number of agglomerates that form when the swollen polymer particles come into touching contact with each other.

The heated slurry enters into fluid chamber 21a through the openings 14a provided in shaft guide 14. The slurry fills fluid chamber 21a and circulates in the direction shown by the arrows by reason of the stirring action of the set of turbine stirring blades 30a. As the polymer slurry reaches the top of fluid chamber 21a, polymer solution and undissolved fine polymer particles will pass through screen cover 22 which, as previously noted, in fabricated from 4 mesh screen. Larger polymer particles and agglomerates of such particles are retained in chamber 21a by screen cover 22. The majority of the polymer particles and agglomerates which contact the screen cover will be swept free thereof by the relative intense stirring action at this site by reason of its proximity of the turbine blades. At times which polymer particles build up to a thickness of ¼ inch or more, the particles will be contacted by the rotating turbine blades of 30a. Such contact will force certain of the polymer particles through the screen, thereby reducing them in size, and will cause other of the particles to be swept down into the liquid circulating in chamber 21a.

The slurry entering fluid chamber 21b, by reason of having passed through screen cover 22, will contain fewer polymer particles and agglomerates than the slurry in fluid chamber 21a. By reason of its longer residence time in the apparatus, it will contain a larger percentage of dissolved ethylene polymer. The physical action imposed on the polymer slurry in fluid chamber 21b will be identical to the physical action taking place in fluid chamber 21a and previously described. As fluid chamber 21b is filled, the dissolved ethylene polymer solution and polymer particles sufficiently small to pass through the 8 mesh screen of screen cover 23 enter into fluid chamber 21c.

The action within fluid chamber 21c, and subsequently the action within fluid chamber 21d, is as previously described. The action in fluid chamber 21e differs only in that the polymer solution is discharged therefrom through line 17.

As the liquid hydrocarbon passes through successive fluid chambers, it dissolves progressively more of the solid ethylene polymer. Heat is supplied (by means not shown) to maintain the temperature required to dissolve the polymer and lower the solution viscosity to a level that is easily handled. The screen covers, with their progressively-smaller mesh openings, retain oversize polymer particles and agglomerates in the lower fluid chambers until they are completely dissolved, or are reduced sufficiently in size to pass through the screen covers. By the time that the hydrocarbon enters into fluid chamber 21e, all of the ethylene polymer particles will have been dissolved.

The polymer dissolving apparatus illustrated in the drawings can be modified in numerous respects while still retaining its operational capabilities as described above. The apparatus can be provided with fewer or more interconnected fluid chambers than illustrated but for maximum assurance that the final solution will be totally free of undissolved polymer particles, a minimum of three fluid chambers should be included in the apparatus. When the fluid chambers are arranged in a stacked, vertical relationship, the overall dimensions should be selected to provide a L/D ratio of about 0.5:1 to 20:1 and preferably about 2:1 to 6:1. Stirring means other than turbine blades can be employed, provided only that such stirring means provide sufficient agitation to free the screens of swollen polymer particles and agglomerates thereof which are pressed against the screens by the flow of fluid passing through the apparatus. The fluid chambers also can be arranged to a horizontal relationship, rather than the vertical relationship illustrated in the drawings. The mesh of the screen covers may be somewhat larger or smaller than illustrated, but the mesh of the covers should be made progressively smaller in each successive downstream fluid chamber. The last of the screen covers, of course, must be sufficiently fine to prevent any solid polymer particles from being discharged from the apparatus. It will be noted that each of the fluid chambers will have a screen cover covering both its inlet and its outlet, with the outlet screen cover having a smaller mesh than the inlet screen cover. As illustrated in the drawings, the inlet screen cover may be and usually is eliminated from the first fluid chamber, and the outlet screen cover may be eliminated from the last fluid chamber.

The process should be operated at a temperature sufficiently high to provide for rapid dissolution of the polymer particles and to minimize the possibility of carrying undissolved polymer particles through the apparatus. When dissolving ultra high molecular weight olefin polymers as described below, temperatures of the order of 190° C or higher should be employed. It is highly desirable to operate the apparatus in a liquid-full condition to minimize the possibility of oxidative degradation of the polymer at the high temperatures employed in the process.

While the apparatus may be employed to dissolve virtually any type of solid polymer in a suitable solvent, the maximum utility of the apparatus is obtained in dissolving difficulty-soluble olefin polymers in a liquid hydrocarbon. A principal example of such a system is that of dissolving an ultra high molecular weight olefin polymer having an inherent viscosity of at least 3.5 in a liquid hydrocarbon, an example of such systems being those set forth in British patent Spec. No. 1,372,116. Any liquid hydrocarbon can be employed in the process of the invention, provided only that its vapor pressure at the operating temperature employed does not exceed the design pressure limitation of the apparatus.

What is claimed is:

1. A process for preparing a hot solution of a high molecular weight olefin polymer that contains essentially no undissolved polymer particles which consists essentially of:
    a. Preparing a polymer slurry by dispersing fine particles of a high molecular weight olefin polymer in a liquid hydrocarbon heated to a temperature of at least about 190° C,
    b. Feeding the polymer slurry of (a) to a first fluid chamber having an inlet and an outlet therein with screens covering both of said inlet and said outlet; the screen covering the outlet having a smaller mesh than the screen covering the inlet,
    c. Discharging polymer solution from said first fluid chamber and passing it through a series of one or more additional fluid chambers, each of which also has an outlet therein with screens covering both the inlet and the outlet, with the screen covering the outlet having a smaller mesh than the screen covering the inlet; the outlet screen of each successive downstream fluid chamber having a smaller mesh than the outlet screen of the upstream fluid chambers,
    d. providing stirring in each fluid chamber to sweep retained resin particles free of the covering of the outlet of said chamber,
    e. supplying heat to the polymer slurry passing through the fluid chambers to maintain a temperature of at least about 190° C, and
    f. recovering from the final fluid chamber a hydrocarbon solution of olefin polymer substantially free of undissolved polymer particles;

said olefin polymer being an olefin polymer having an inherent viscosity of at least 3.5.

2. The process of claim 1 in which the olefin polymer employed in the process is an ethylene polymer.

3. The process of claim 1 in which the stirring within the fluid chambers is provided by rotating a set of stirring blades positioned in the plane of the outlet screen and in close proximity thereto, so that said rotating blades contact any swollen polymer particles.

4. The process of claim 3 in which the olefin polymer employed in the process is an ethylene polymer.

5. The process of claim 4 in which sufficient heat is supplied to heat the polymer slurry to a temperature of at least about 190° C.

* * * * *